No. 798,934. PATENTED SEPT. 5, 1905.
L. VUITHIER.
MICROMETER.
APPLICATION FILED DEC. 24, 1904.

2 SHEETS—SHEET 1.

WITNESSES:

INVENTOR
Louis Vuithier
BY
ATTORNEYS.

No. 798,934. PATENTED SEPT. 5, 1905.
L. VUITHIER.
MICROMETER.
APPLICATION FILED DEC. 24, 1904.

2 SHEETS—SHEET 2.

WITNESSES:
Henry J. Vuithier.

INVENTOR
Louis Vuithier
BY Gower & Niles
ATTORNEYS.

UNITED STATES PATENT OFFICE.

LOUIS VUITHIER, OF LODE, SWITZERLAND.

MICROMETER.

No. 798,934.　　　Specification of Letters Patent.　　　Patented Sept. 5, 1905.

Application filed December 24, 1904. Serial No. 238,259.

*To all whom it may concern:*

Be it known that I, LOUIS VUITHIER, a citizen of the Republic of Switzerland, and a resident of Lode, Switzerland, have invented certain new and useful Improvements in Micrometer-Gages, of which the following is a specification.

This invention relates to micrometer-gages, such as used for measuring very small dimensions; and among the objects of the invention is the provision of an instrument of this type by means of which the measurement taken will be accurately registered upon a dial.

The invention also aims to provide a micrometer-gage provided with a "corrector" for offsetting the inaccuracies of measurement which would otherwise be caused by the unavoidable inaccuracies in form of the operative parts; and with these ends in view the invention consists in a micrometer-gage embodying the novel features and combinations of parts to be hereinafter described, and recited in the claims.

Figure 3:
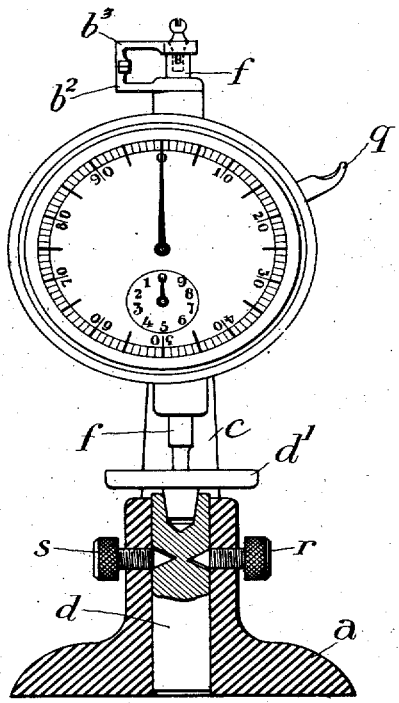
Figure 4:
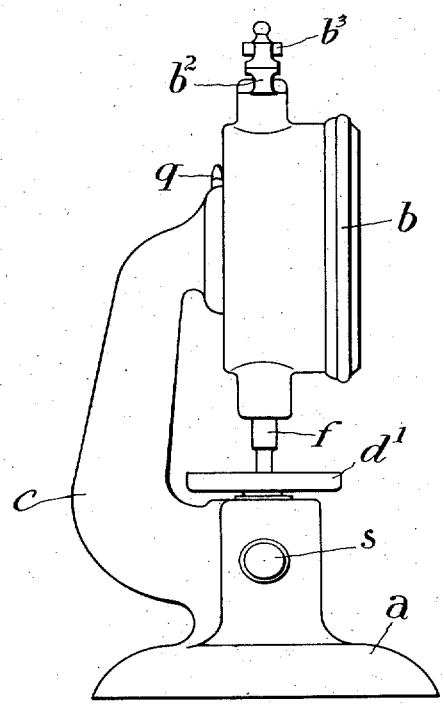
Figure 1:
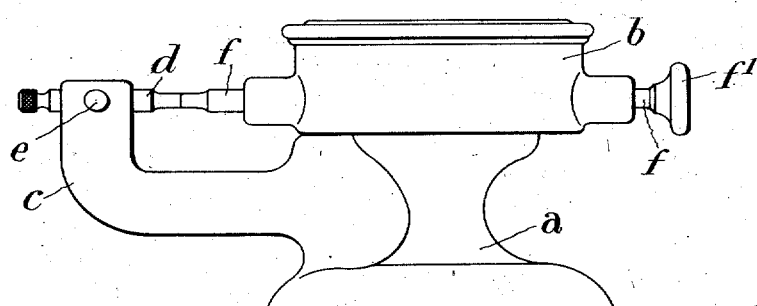
Figure 5:
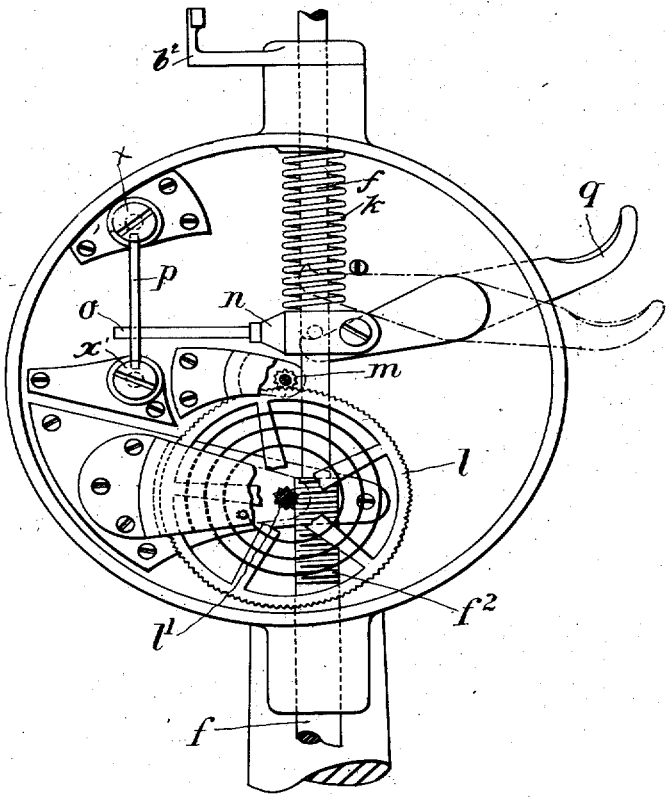
Figure 2:
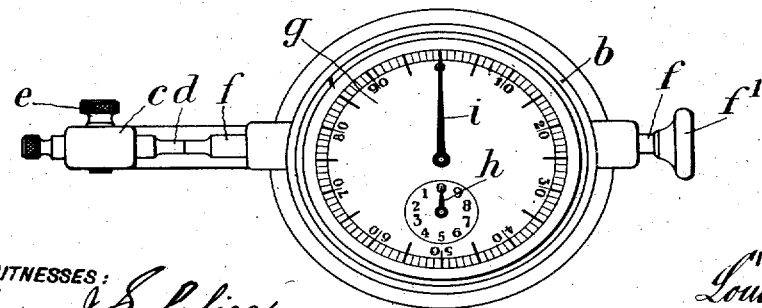

In the accompanying drawings, Figure 1 is an elevation of a micrometer-gage embodying my invention, the dial and the measuring-spindles being arranged horizontally. Fig. 2 is a plan view of the instrument shown in Fig. 1. Fig. 3 is a front elevation of an upright micrometer-gage constructed according to my invention, the lower portion thereof being shown in section. Fig. 4 is a side elevation of the instrument shown in Fig. 3. Fig. 5 is an elevation of the operative parts contained in the casing of the instrument, the dial and hands being removed; and Fig. 6 is a central section through said casing, the dial and hands being in position.

Similar characters of reference indicate corresponding parts throughout the several views.

The instrument shown in Figs. 1 and 2 comprises a frame, the base $a$ of which is intended to be placed upon a horizontal base-plate or other suitable support. The base $a$ supports a casing $b$, which contains the indicating mechanism. $c$ indicates a curved arm fastened to the base $a$ and casing $b$, as shown in Fig. 1, and carrying at its outer end a spindle $d$, which is adjusted by hand and fixed in adjusted position by means of a set-screw $e$, the end of said spindle being intended to abut against the object to be measured. A longitudinally-movable spindle or rod $f$ extends through the casing $b$ and is adapted to press at one end against the object, so as to retain the same between it and the spindle $d$, the spindles $d$ and $f$ being axially alined. A knob $f'$ serves to adjust the spindle $f$, which actuates the indicating mechanism by means of which the measurement is indicated upon the dial carried by the casing by the hands $h$ and $i$.

Figure 6:
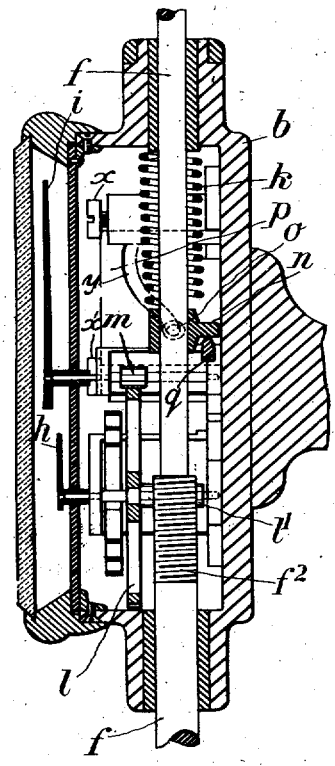

The indicating mechanism, which is of substantially the same construction in both the horizontal and upright forms of the gage, is shown in Figs. 5 and 6. The spindle $f$ is movable longitudinally through the casing $b$, as explained, and is also rotatable in its bearings, being provided throughout a portion of its length with screw-threads $f^2$, which engage a pinion $l'$, acting in the manner of a rack to rotate said pinion when said spindle $f$ is shifted longitudinally and as a worm to rotate the same upon the rotation of said spindle. The shaft of the pinion $l'$ carries a gear-wheel $l$, which in turn operates a pinion $m$, upon which the hand $i$ is mounted. The other hand $h$ is keyed to the arbor of the gear-wheel $l$ and pinion $l'$. In order that the instrument may measure in decimal fractions, the pinion $l'$ is preferably provided with ten teeth and the gear-wheel $l$ with one hundred teeth. Supposing the threaded portion of the shaft $f$ to have a pitch of one millimeter, the hand $i$ will register upon the dial the hundredths of a millimeter and the hand $h$, secured to the arbor of the gear-wheel $l$ and pinion $l'$, will register in millimeters up to ten millimeters. A fixed piece $n$ is secured to the spindle $f$ intermediately of its length, and a spring $k$ is interposed between the side wall of the casing and said fixed piece, as shown in Fig. 5, in order to normally maintain the rod $f$ and member $d$, with which it coöperates, in engagement with each other, the tendency of the spring acting upon the fixed piece $n$ being to force the spindle $f$ longitudinally toward the spindle $d$. In order to permit of the insertion of the object to be measured between the spindles $d$ and $f$, a lever $q$ is provided, which is pivoted adjacent the rod $f$ and abuts at its inner end against the fixed piece $n$, as shown best in Fig. 6, so that upon the pivotal movement of said lever the fixed piece $n$, and consequently the spindle $f$, will be forced away from the spindle $d$ against the tension of the spring $k$. In order to offset the errors of measurement which are liable to occur, owing to slight inaccuracies in the threading of the rod or spindle $f$ or in the teeth of the gear-wheels, a corrector is provided, which consists, essentially, of a guide-plate $p$, which is maintained in position by set-screws $x$ and $x'$, as shown in Figs. 5 and 6, and which therefore may be easily withdrawn when it is necessary to change the form of the slot $y$ therein and replaced in position. The guide-plate $p$ is provided with a slot $y$, as shown in Fig. 6, in which is movable an outwardly-extending arm $o$, carried by the fixed piece $n$. It is obvious that by means of the slot $y$ the spindle $f$ may be rotated slightly by the rocking of the arm $o$, guided in the slot $y$, the consequent rotation of the screw-threads $f^2$ effecting the rotation of the pinion $l'$ in the same manner as when the spindle $f$ is shifted longitudinally. When the instrument is constructed, the slot $y$ in the guide-plate $p$ is cut in such a form as to cause the rotation of the spindle $f$ either in order to advance or set back the pinion $l'$, and consequently the hands $h$ and $i$, thus offsetting the inaccuracies of the instrument. At the points in the movement of the spindle in which the inaccuracies of the operative parts do not affect the measurement the guide-slot $y$ is formed parallel to the spindle $f$, so that no rotation of the latter will take place. The shape of the guide-slot can be readily plotted for each instrument by ascertaining the occurring errors by comparison with a standard. A block or other object of standard dimensions is placed between the parts $d$ and $f$ and the measurement taken. If the measurement thus indicated by the pointer is too great or too small, the slot in the guide-plate has to be cut in such a manner as to set back or advance the pointer, and thus rectify the error. It is apparent that by using a number of such standards of different sizes the groove may be plotted so as to properly control the measuring-spindle throughout the length of its movement.

In the form of the instrument shown in Figs. 3 and 4 the vertical rod $d$, which serves as a fixed support, carries a horizontal plate $d'$, which can be very accurately fixed in a vertical position by means of two set-screws $r$ and $s$, which are screwed into the base $a$, the conical ends thereof engaging conical recesses in the spindle $d$. By screwing the screw $r$ the rod or spindle $d$ will be raised, and by screwing the screw $s$ the said rod will be lowered. When both screws are adjusted, the rod $d$ will be firmly clamped in the desired position. The casing $b$, furthermore, carries at its opposite end a fixed jaw $b^2$, and the opposite end of the rod or spindle $f$ carries a corresponding movable jaw $b^3$. These jaws $b^2$ and $b^3$ may be used for measuring objects which cannot be readily inserted between the spindle $f$ and the plate $d'$.

Having thus described my invention, I claim as new and desire to secure by Letters Patent—

1. In a micrometer-gage, the combination, with a measuring-spindle mounted for rotation, of means for longitudinally shifting said spindle, indicating mechanism actuated by both the longitudinal and the rotary movement of said spindle, and means for rotating the latter at predetermined points in its longitudinal movement.

2. In a micrometer-gage, the combination, with a rotary longitudinally-shiftable measuring-spindle provided with screw-threads, of a pinion meshing with said screw-threads and rotatable by both the longitudinal and rotary movement of said spindle, and indicating mechanism actuated by said pinion.

3. A micrometer-gage including a rotary longitudinally-shiftable measuring-spindle, indicating mechanism operable by both the longitudinal and rotary movement of the latter, an arm fixed to said spindle and means for rocking said arm at predetermined points in the longitudinal movement of said spindle in order to advance or set back the pointer which indicates the measurement.

4. A micrometer-gage including a rotary longitudinally-shiftable measuring-spindle, indicating mechanism operable by both the longitudinal and the rotary movement of said spindle, an arm fixed to said spindle, and means for guiding said arm.

5. A micrometer-gage including a rotary longitudinally-shiftable measuring-spindle, indicating mechanism operable by both the longitudinal and the rotary movement of said spindle, an arm fixed to said spindle, and a guide-plate engaging said arm.

6. In a micrometer-gage, the combination, with a rotary longitudinally-shiftable measuring-spindle, indicating mechanism governed by both the longitudinal and rotary movement of said spindle, a guide-plate provided with a slot, and an arm fixed to said spindle and movable in said slot.

In testimony whereof I have signed my name to this specification in the presence of two subscribing witnesses.

LOUIS VUITHIER.

Witnesses:
JULES CHAPNY,
VITOL SOHIERCH.

Correction in Letters Patent No. 798,934.

It is hereby certified that the residence of the patentee in Letters Patent No. 798,934, granted September 5, 1905, upon the application of Louis Vuithier, for an improvement in "Micrometers," was erroneously written and printed "Lode, Switzerland," whereas said residence should have been written and printed *Locle, Switzerland;* and that said Letters Patent should be read with this correction therein that the same may conform to the record of the case in the Patent Office.

Signed and sealed this 17th day of October, A. D., 1905.

[SEAL.]

F. I. ALLEN,

*Commissioner of Patents.* tained in position by set-screws $x$ and $x'$, as shown in Figs. 5 and 6, and which therefore may be easily withdrawn when it is necessary to change the form of the slot $y$ therein and replaced in position. The guide-plate $p$ is provided with a slot $y$, as shown in Fig. 6, in which is movable an outwardly-extending arm $o$, carried by the fixed piece $n$. It is obvious that by means of the slot $y$ the spindle $f$ may be rotated slightly by the rocking of the arm $o$, guided in the slot $y$, the consequent rotation of the screw-threads $f^2$ effecting the rotation of the pinion $l'$ in the same manner as when the spindle $f$ is shifted longitudinally. When the instrument is constructed, the slot $y$ in the guide-plate $p$ is cut in such a form as to cause the rotation of the spindle $f$ either in order to advance or set back the pinion $l'$, and consequently the hands $h$ and $i$, thus offsetting the inaccuracies of the instrument. At the points in the movement of the spindle in which the inaccuracies of the operative parts do not affect the measurement the guide-slot $y$ is formed parallel to the spindle $f$, so that no rotation of the latter will take place. The shape of the guide-slot can be readily plotted for each instrument by ascertaining the occurring errors by comparison with a standard. A block or other object of standard dimensions is placed between the parts $d$ and $f$ and the measurement taken. If the measurement thus indicated by the pointer is too great or too small, the slot in the guide-plate has to be cut in such a manner as to set back or advance the pointer, and thus rectify the error. It is apparent that by using a number of such standards of different sizes the groove may be plotted so as to properly control the measuring-spindle throughout the length of its movement.

In the form of the instrument shown in Figs. 3 and 4 the vertical rod $d$, which serves as a fixed support, carries a horizontal plate $d''$, which can be very accurately fixed in a vertical position by means of two set-screws $r$ and $s$, which are screwed into the base $a$, the conical ends thereof engaging conical recesses in the spindle $d$. By screwing the screw $r$ the rod or spindle $d$ will be raised, and by screwing the screw $s$ the said rod will be lowered. When both screws are adjusted, the rod $d$ will be firmly clamped in the desired position. The casing $b$, furthermore, carries at its opposite end a fixed jaw $b^2$, and the opposite end of the rod or spindle $f$ carries a corresponding movable jaw $b^3$. These jaws $b^2$ and $b^3$ may be used for measuring objects which cannot be readily inserted between the spindle $f$ and the plate $d'$.

Having thus described my invention, I claim as new and desire to secure by Letters Patent—

1. In a micrometer-gage, the combination, with a measuring-spindle mounted for rotation, of means for longitudinally shifting said spindle, indicating mechanism actuated by both the longitudinal and the rotary movement of said spindle, and means for rotating the latter at predetermined points in its longitudinal movement.

2. In a micrometer-gage, the combination, with a rotary longitudinally-shiftable measuring-spindle provided with screw-threads, of a pinion meshing with said screw-threads and rotatable by both the longitudinal and rotary movement of said spindle, and indicating mechanism actuated by said pinion.

3. A micrometer-gage including a rotary longitudinally-shiftable measuring-spindle, indicating mechanism operable by both the longitudinal and rotary movement of the latter, an arm fixed to said spindle and means for rocking said arm at predetermined points in the longitudinal movement of said spindle in order to advance or set back the pointer which indicates the measurement.

4. A micrometer-gage including a rotary longitudinally-shiftable measuring-spindle, indicating mechanism operable by both the longitudinal and the rotary movement of said spindle, an arm fixed to said spindle, and means for guiding said arm.

5. A micrometer-gage including a rotary longitudinally-shiftable measuring-spindle, indicating mechanism operable by both the longitudinal and the rotary movement of said spindle, an arm fixed to said spindle, and a guide-plate engaging said arm.

6. In a micrometer-gage, the combination, with a rotary longitudinally-shiftable measuring-spindle, indicating mechanism governed by both the longitudinal and rotary movement of said spindle, a guide-plate provided with a slot, and an arm fixed to said spindle and movable in said slot.

In testimony whereof I have signed my name to this specification in the presence of two subscribing witnesses.

LOUIS VUITHIER.

Witnesses:
JULES CHAPNY,
VITOL SOHIERCH.

Correction in Letters Patent No. 798,934.

It is hereby certified that the residence of the patentee in Letters Patent No. 798,934, granted September 5, 1905, upon the application of Louis Vuithier, for an improvement in "Micrometers," was erroneously written and printed "Lode, Switzerland," whereas said residence should have been written and printed *Locle, Switzerland;* and that said Letters Patent should be read with this correction therein that the same may conform to the record of the case in the Patent Office.

Signed and sealed this 17th day of October, A. D., 1905.

[SEAL.]

F. I. ALLEN,
*Commissioner of Patents.*

Correction in Letters Patent No. 798,934.

It is hereby certified that the residence of the patentee in Letters Patent No. 798,934, granted September 5, 1905, upon the application of Louis Vuithier, for an improvement in "Micrometers," was erroneously written and printed "Lode, Switzerland," whereas said residence should have been written and printed *Locle, Switzerland;* and that said Letters Patent should be read with this correction therein that the same may conform to the record of the case in the Patent Office.

Signed and sealed this 17th day of October, A. D., 1905.

[SEAL.]

F. I. ALLEN,
*Commissioner of Patents.*